United States Patent
Veit-Salomon et al.

(10) Patent No.: US 6,224,144 B1
(45) Date of Patent: May 1, 2001

(54) CAR BODY WITH BODY FRAMEWORK

(75) Inventors: Emil Veit-Salomon; Tobias Koch, both of Nürnberg (DE)

(73) Assignee: ABB Daimler-Benz Transportation (Technology) GmbH (DE)

( * ) Notice: Subject to any disclaimer, the term of this patent is extended or adjusted under 35 U.S.C. 154(b) by 0 days.

(21) Appl. No.: 09/407,414

(22) Filed: Sep. 29, 1999

(30) Foreign Application Priority Data

Sep. 30, 1998 (DE) .............................................. 198 44 811

(51) Int. Cl.$^7$ ...................................................... B60J 7/00
(52) U.S. Cl. .................... 296/203.03; 296/181; 296/191; 296/197; 296/178; 296/29
(58) Field of Search ................................. 296/178, 196, 296/197, 193, 203.01, 203.03, 191, 29, 181, 183; 105/401

(56) References Cited

U.S. PATENT DOCUMENTS

| | | | |
|---|---|---|---|
| 2,823,066 | * 2/1958 | Maxson | 296/29 |
| 3,334,007 | * 8/1967 | Flagan | 296/29 |
| 3,380,216 | * 4/1968 | Spence | 296/181 |
| 3,393,920 | * 7/1968 | Ehrlich | 296/181 |
| 4,007,567 | * 2/1977 | Mooney et al. | 296/29 |
| 4,221,426 | * 9/1980 | Wardill | 296/178 |
| 4,254,497 | * 3/1981 | Leonardis | 296/178 |
| 4,283,086 | * 8/1981 | Morin | 296/197 |
| 4,420,183 | * 12/1983 | Sherman | 296/181 |
| 4,469,369 | * 9/1984 | Belik et al. | 296/197 |
| 4,773,701 | * 9/1988 | Messori | 296/178 |
| 5,066,066 | * 11/1991 | Yurgevich et al. | 296/191 |
| 5,066,067 | * 11/1991 | Ferdows | 296/197 |
| 5,140,913 | * 8/1992 | Takeichi et al. | 296/191 |
| 5,195,800 | * 3/1993 | Stafford et al. | 296/181 |
| 5,433,501 | * 7/1995 | Thomas et al. | 296/29 |
| 5,664,826 | * 9/1997 | Wilkens | 296/191 |
| 5,685,229 | * 11/1997 | Ohara et al. | 296/191 |
| 5,690,378 | * 11/1997 | Romesburg | 296/197 |
| 5,791,726 | * 8/1998 | Kaufaman | 296/181 |
| 5,934,739 | * 8/1999 | Waldeck | 296/178 |
| 5,934,742 | * 8/1999 | Fenton et al. | 296/191 |
| 5,938,274 | * 8/1999 | Ehrlich | 296/181 |
| 5,992,117 | * 11/1999 | Schmidt | 296/181 |
| 5,997,076 | * 12/1999 | Ehrlich | 296/191 |

FOREIGN PATENT DOCUMENTS

| | | |
|---|---|---|
| 1900649 | 8/1969 | (DE) . |
| 19537498 | 4/1997 | (DE) . |

* cited by examiner

*Primary Examiner*—Joseph D. Pape
*Assistant Examiner*—Kiran Patel
(74) *Attorney, Agent, or Firm*—Webb Ziesenheim Logsdon Orkin & Hanson, P.C.

(57) ABSTRACT

On a car body with a car body framework 1, for ease of assembly and effective utilization of space, in the vicinity of the side wall structure of each body framework field 7, a partial side wall element 8 is inserted that projects into the space between the corresponding frames 6.

20 Claims, 2 Drawing Sheets

CAR BODY WITH BODY FRAMEWORK

BACKGROUND OF THE INVENTION

1. Field of the Invention

This invention relates to a car bodies and, in particular to railway vehicle bodies.

2. Brief Description of the Prior Art

A similar car body of the prior art (DE 1900649 U1) consists of a body framework that has continuous top and bottom horizontal longitudinal beams, each of which is firmly connected to the other in the vicinity of the side walls, the roof and the floor structure by frames that run perpendicular to the four longitudinal beams. The individual open body framework fields that are formed between the frames and the longitudinal beams are thereby covered by means of partial side wall elements. The partial side wall elements that are adjacent to one another are tightly connected to one another along their outside edges. The partial side wall elements can be equipped on their insides with the conventional equipment for compartments, namely with fixed or folding seats.

The object of the invention, is to indicate measures that make possible a simple assembly operation and an efficient utilization of the space between the lateral frames of the car body framework.

SUMMARY OF THE INVENTION

When a car body is constructed as claimed by the invention, fully pre-assembled partial side wall elements, which can be provided as necessary with fixtures and equipment elements such as seats etc. and the finished interior wall covering can be inserted from outside into the respective open car body framework field. The respective partial side wall element thereby projects at least partly in particular into the area in the space between the frames, in which a thermal or acoustical insulation layer is inserted between the outside wall surface and the inside wall lining. The individual partial side wall elements are fastened to the vertical frames by means of an adhesive compound that at least in the area of the vertical side edges overlaps the entire length between the frame and the side edge when the parts are assembled. The partial side wall element is thereby stepped back in particular on its vertical side edges step-wise in the depth direction, so that its exposed outer edge areas have a segment that has a lower wall thickness than the segments between them in the longitudinal direction of the car body. As a result of this stepped configuration, the outer segment that has the lower wall thickness projects in front of the outer surface of the corresponding frame. Partial side wall elements that are adjacent to one another are therefore in contact with one another in a plane that is flush with their outer surfaces. The adhesive connection of the partial side wall elements to the corresponding frames is preferably accomplished by applying a continuous bead of adhesive to the outside of the corresponding frame, on which the inside of the related segment that has the lower wall thickness of the corresponding partial side wall element is placed. The respective segment that has the lower wall thickness thereby extends approximately to the center of the corresponding frame, so that between the adjacent partial side wall elements there remains a gap that is filled with jointing compound. A tight seal between the partial side wall elements is thereby achieved. In the depth direction, for example toward the center of the car body, it becomes possible as a result of the stepping of the respective partial side wall element not only to utilize the space between the frames, but to make the wall thickness large enough that the interior lining of the partial side wall element projects beyond the inside of the corresponding frame. The vertical frames are thereby protected by their location between neighboring partial side wall elements, whereby the neighboring partial side wall elements can be connected with one another by means of a lining that connects their interior surfaces and straddles the inside of the corresponding frame. The frames are thereby lined all around and do not present any hazardous surfaces either on the inside or the outside. The respective partial side wall element can be connected with the floor structure or with the corresponding bottom longitudinal beam by shaping a tongue on the lower horizontal inboard longitudinal edges of the partial side wall element in question, which tongue fits into a matching groove of a groove strip provided in the vicinity of the corresponding longitudinal beam, which groove strip is fixed in the space between the frames.

DETAILED DESCRIPTION OF THE PREFERRED EMBODIMENT

Figure 1:
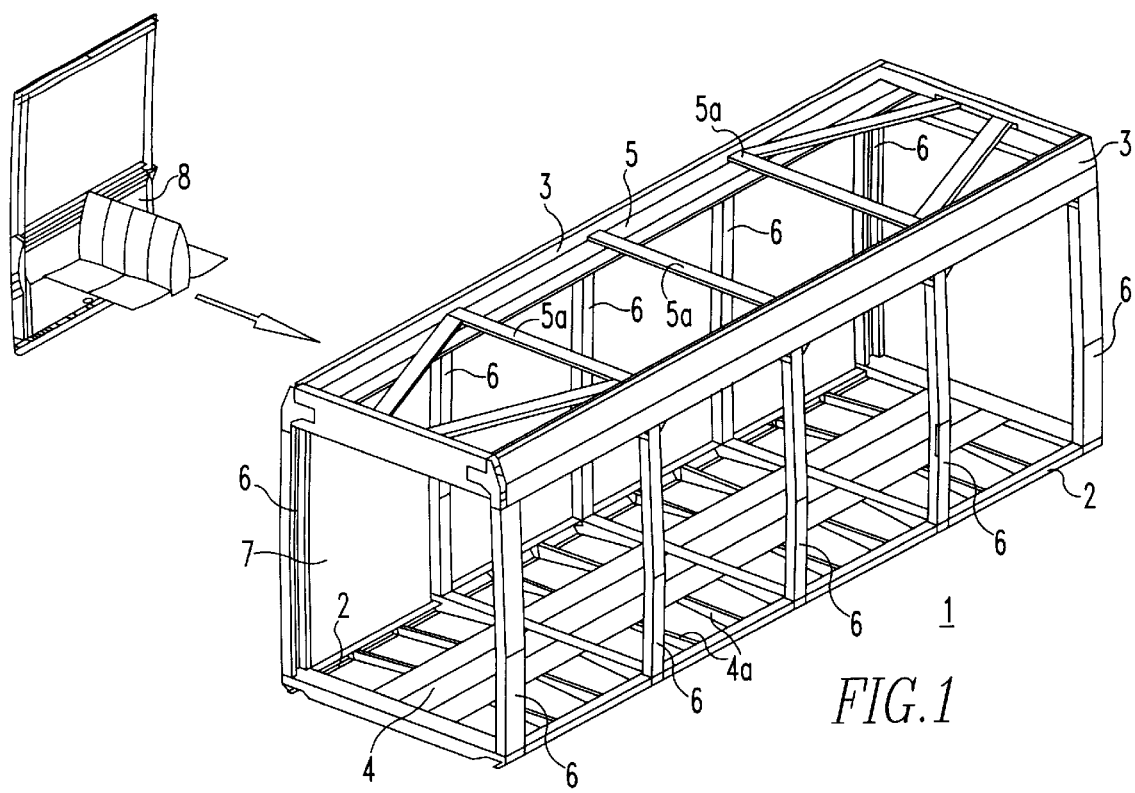
FIG. 1 is a perspective view of a car body framework with a partial side wall element in an exploded view, with an inside view of the partial side wall element.
Figure 2:
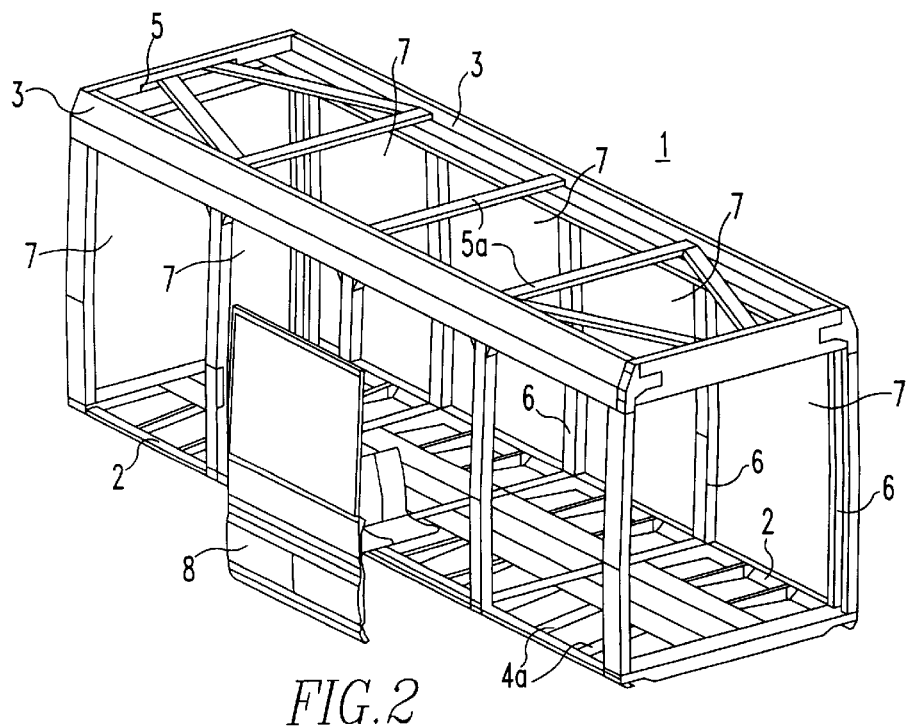
FIG. 2 shows the system illustrated in FIG. 1, with an outside view of the partial side wall element.

A body framework 1 for a car body, in particular for a railway vehicle, is constructed from two bottom longitudinal beams 2 that run parallel to one another, and two top longitudinal beams 3 that also run parallel to one another in the longitudinal direction of the car body, as well as to the bottom longitudinal beams 2. The bottom longitudinal beams 2 are thereby connected to each other by means of a floor structure 4 that comprises frames 4a that run at a right angle to the beams 2. In the vicinity of the receptacle 5 for a roof, the top longitudinal beams 3 are connected by frames 5a that also run at a right angle to the longitudinal direction. For the realization of the side wall structure, which stands at least substantially vertically, the bottom and top longitudinal beams 2, 3 are firmly connected by frames 6 that run vertically. The frames 6 run parallel to one another, whereby between neighboring frames 6 and the associated segments of the longitudinal beams 2, 3, respective open body framework fields 7 are formed. These body framework fields 7 are closed by means of appropriately designed partial side wall elements 8.

Figure 3:
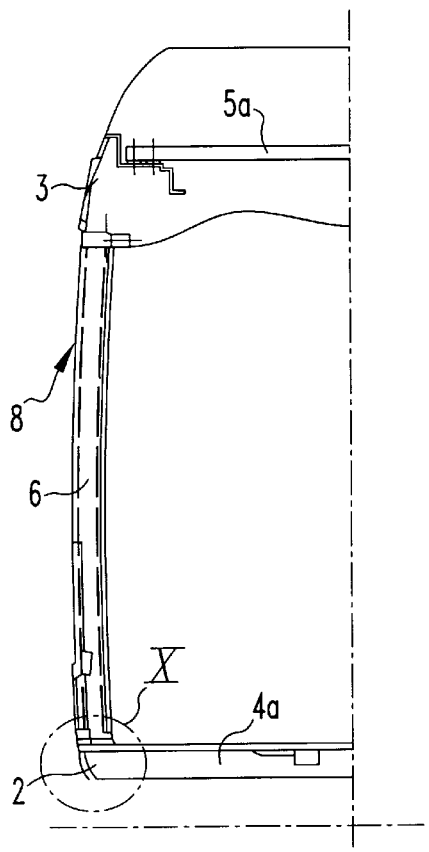
FIG. 3 is a section through one side of the car body with the partial side wall element in place.
Figure 4:
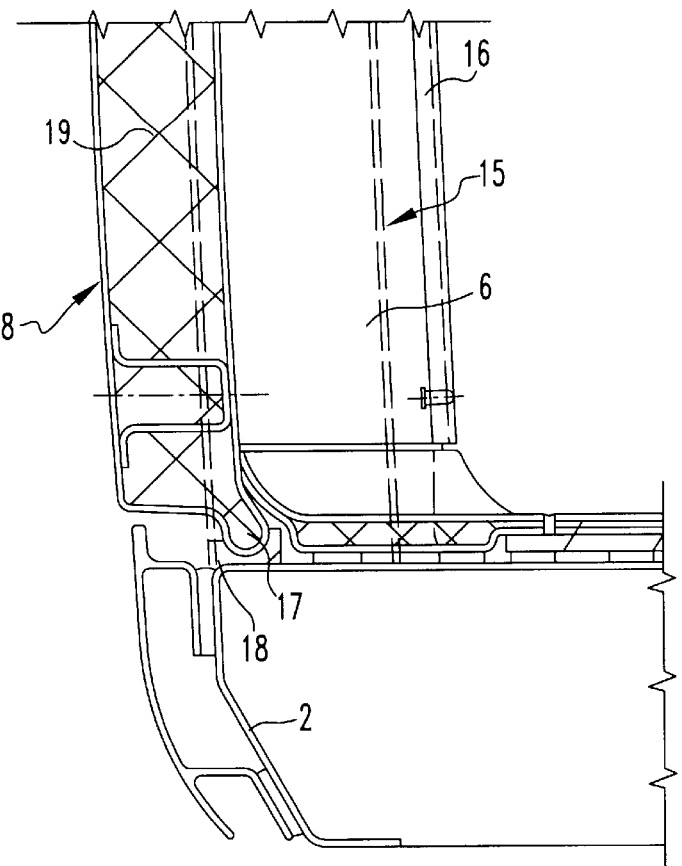
FIG. 4 is a partial enlarged illustration of the system illustrated in FIG. 3 in the area X.
Figure 5:
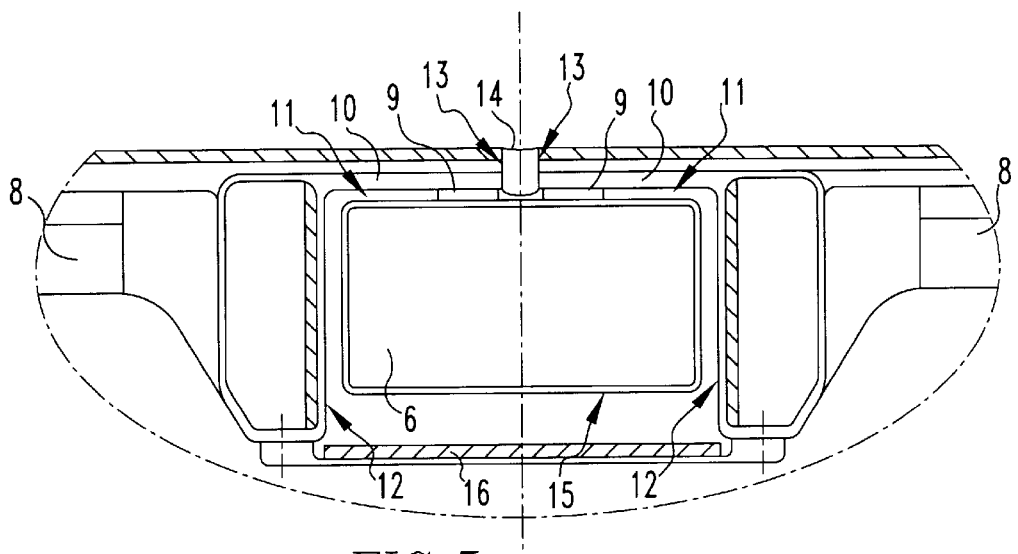
FIG. 5 is a cross section in the vicinity of a frame.

In the final assembled state as illustrated in FIG. 3, the respective partial side wall element 8 projects in the depth direction, for example toward the center of the car body, at least partly into the space that is enclosed between neighboring frames 6. This partial side wall element 8, for its part, is fixed to the corresponding frames 6 by means of an elastic adhesive compound 9 (FIG. 5). The frames 6 are thereby incorporated into the side wall structure. It is thereby appropriate to step back the respective partial side wall element 8 along its vertical lateral edges in the depth direction, so that an outer segment 10 with a lower wall thickness is formed, that is engaged in front of the outside 11 of the frame 6, while the step flank 12 that begins at that point and ascends in the depth direction is laterally next to the frame 6. The terminal edges 13 of the segments 10 extend to almost the center of the corresponding frame 6, whereby a jointing compound 14 is introduced between the terminal edges 13 that are opposite one another. The segments 10 or the outside surfaces of the associated partial side wall elements 8 thereby form a smooth surface next to one another.

The segments 10 with the wall thickness that is less than the thickness of the segment between them are fixed in position over their entire length by means of an uninterrupted and continuous bead of the adhesive compound 9 on the outer side 11 of the frame 6 in question, so that in addition to a reliable elastic connection, there is also an air-tight and water-tight closure. The step flanks 12 of the individual partial side wall elements 8 are large enough in the depth direction so that they project beyond the inner sides 15 of the frames 6 toward the center of the car body. The frames 6 are thereby integrated into the side wall structure, and are also connected to one another by means of a lining 16 that straddles the inner side 15 of the frame 6. The lining 16 also completely covers the frame 6.

The projection of the partial side wall elements 8 into the space between the frames 6 also makes possible a functionally appropriate connection between the bottom horizontal longitudinal edge of the partial side wall elements 8 and the body framework 1 in the vicinity of the respective bottom longitudinal beam 2. For this purpose, the partial side wall element 8 is provided on its bottom horizontally running inner longitudinal edge with a tongue 17 that extends over the entire length, which tongue 17 is engaged in a form-fitting manner in a matching groove strip 18 that is open on top. The groove strip 18 is thereby fixed in position in the vicinity of the longitudinal beam 2 or of the floor structure 4a. This arrangement facilitates the assembly process in particular, because the partial side wall elements 8 in question are tipped on the upper side of the car body framework 1 with the tongue 17 into the matching groove of the groove strip 18, and are then tilted toward the two corresponding frames 6. The previously injected adhesive compound 9 then creates an elastic mechanical fastening of the partial side wall elements 8 with the respective frame 6.

When the outer surface of the partial side wall elements 8 is smooth and continuous, the wall thickness of the wall elements decreases from the step flank 12 or the lining 16 outward toward the center area. Cavities between the outer surface and the inner surface of the partial side wall element 8 are filled at least largely with thermal and/or acoustical insulation compound 19, in particular with foam insulation. The side wall elements can also be realized in the form of door elements.

What is claimed is:

1. A car body with a car body framework comprising:

continuous top and bottom longitudinal beams that are firmly connected with each other only by means of two frames that run perpendicular to the longitudinal beams; and partial side wall elements, each of which covers a body framework that is enclosed between the longitudinal beams and the two frames;

wherein the respective partial side wall elements project at least partly into a space between the corresponding frames, the partial side wall elements have a wall thickness in a vicinity of the frames being large enough that an interior lining projects laterally beyond an inside of the corresponding frames, and the wall thickness decreases from the frame outward towards a center area.

2. The car body as claimed in claim 1 wherein:

each of the partial side wall elements is along its vertical side edges in the form of a step in a depth direction such that its exposed edge areas have a segment that has a lower wall thickness than the segment between them; and the segment that has the lower wall thickness is flush with an outside surface of the corresponding partial side wall element and covers the outside of the corresponding frame to approximately a center of the frame.

3. The car body as claimed in claim 2 wherein the segments that have the lower wall thickness are connected to the corresponding frames by a continuous adhesive compound bead.

4. The car body as claimed in claim 1 wherein there is a gap that is filled with jointing compound between vertical terminal edges of neighboring partial side wall elements.

5. The car body as claimed in claim 1 wherein neighboring partial side wall elements are connected to each other by a lining that straddles an inside of the corresponding frame.

6. The car body as claimed in claim 1 wherein the partial side wall elements each have a tongue on a bottom horizontal inboard longitudinal edge that is engaged in a matching groove of a groove strip located adjacent the corresponding longitudinal beam in the space between the frames.

7. The car body as claimed in claim 1 wherein the respective partial side wall elements are fastened to the frames by an elastic adhesive compound.

8. The car body as claimed in claim 2 wherein there is a gap that is filled with jointing compound between vertical terminal edges of neighboring partial side wall elements.

9. The car body as claimed in claim 3 wherein there is a gap that is filled with jointing compound between vertical terminal edges of neighboring partial side wall elements.

10. The car body as claimed in claim 2 wherein:

the partial side wall elements project laterally in the vicinity of the frames beyond inner sides of the respective frames; and neighboring partial side wall elements are connected to each other by a lining that straddles an inside of the corresponding frame.

11. The car body as claimed in claim 3 wherein:

the partial side wall elements project laterally in the vicinity of the frames beyond inner sides of the respective frames; and neighboring partial side wall elements are connected to each other by a lining that straddles an inside of the corresponding frame.

12. The car body as claimed in claim 4 wherein:

the partial side wall elements project laterally in the vicinity of the frames beyond inner sides of the respective frames; and neighboring partial side wall elements are connected to each other by a lining that straddles an inside of the corresponding frame.

13. The car body as claimed in claim 2 wherein the partial side wall elements each have a tongue on a bottom horizontal inboard longitudinal edge that is engaged in a matching groove of a groove strip located adjacent the corresponding longitudinal beam in the space between the frames.

14. The car body as claimed in claim 3 wherein the partial side wall elements each have a tongue on a bottom horizontal inboard longitudinal edge that is engaged in a matching groove of a groove strip located adjacent the corresponding longitudinal beam in the space between the frames.

15. The car body as claimed in claim 4 wherein the partial side wall elements each have a tongue on a bottom horizontal inboard longitudinal edge that is engaged in a matching groove of a groove strip located adjacent the corresponding longitudinal beam in the space between the frames.

16. The car body as claimed in claim 5 wherein the partial side wall elements each have a tongue on a bottom horizontal inboard longitudinal edge that is engaged in a matching groove of a groove strip located adjacent the corresponding longitudinal beam in the space between the frames.

17. The car body as claimed in claim 2 wherein the respective partial side wall elements are fastened to the frames by an elastic adhesive compound.

18. The car body as claimed in claim 3 wherein the respective partial side wall elements are fastened to the frames by an elastic adhesive compound.

19. The car body as claimed in claim 4 wherein the respective partial side wall elements are fastened to the frames by an elastic adhesive compound.

20. The car body as claimed in claim 5 wherein the respective partial side wall elements are fastened to the frames by an elastic adhesive compound.

* * * * *